US008503753B2

(12) United States Patent
Zhang et al.

(10) Patent No.: US 8,503,753 B2
(45) Date of Patent: Aug. 6, 2013

(54) SYSTEM AND METHOD FOR TRIANGULAR INTERPOLATION IN IMAGE RECONSTRUCTION FOR PET

(75) Inventors: Chong Zhang, Long Grove, IL (US); Yun Dong, Chicago, IL (US); Wenli Wang, Briarcliff Manor, NY (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 148 days.

(21) Appl. No.: 12/958,762

(22) Filed: Dec. 2, 2010

(65) Prior Publication Data

US 2012/0141001 A1    Jun. 7, 2012

(51) Int. Cl.
*G06K 9/00* (2006.01)
(52) U.S. Cl.
USPC ............ 382/131; 345/173; 382/132; 382/284
(58) Field of Classification Search
USPC ......................................... 382/131, 272–279
See application file for complete search history.

(56) References Cited

U.S. PATENT DOCUMENTS

| 6,002,738 | A  | * | 12/1999 | Cabral et al. ................ 378/4 |
| 6,625,249 | B1 | * | 9/2003  | Temkin et al. ................ 378/4 |
| 7,444,011 | B2 | * | 10/2008 | Pan et al. ................ 382/131 |
| 7,623,702 | B2 | * | 11/2009 | Arata et al. ............... 382/154 |
| 7,848,559 | B2 | * | 12/2010 | Defrise et al. ............ 382/132 |
| 7,923,690 | B2 | * | 4/2011  | Thielemans ........... 250/363.03 |
| 8,121,378 | B2 | * | 2/2012  | George et al. ............ 382/131 |
| 2007/0165035 | A1 | * | 7/2007  | Duluk et al. .............. 345/506 |
| 2007/0253617 | A1 | * | 11/2007 | Arata et al. .............. 382/154 |
| 2008/0056550 | A1 | * | 3/2008  | Kadir et al. ............... 382/131 |
| 2008/0095465 | A1 | * | 4/2008  | Mullick et al. ............ 382/284 |
| 2009/0154641 | A1 | * | 6/2009  | Thielemans ................ 378/21 |
| 2011/0142316 | A1 | * | 6/2011  | Wang et al. ............... 382/131 |
| 2013/0044073 | A1 | * | 2/2013  | Christiansson et al. ...... 345/173 |

OTHER PUBLICATIONS

Zhu et al., Conditional entropy maximization for PET image reconstruction using adaptive mesh model, 2007, Computerized Medical Imaging and Graphics 31 (2007) 166-177.*
Isaac Amidror, "Scattered data interpolation methods for electronic imaging systems: a survey", Journal of Electronics Imaging, Apr. 2002, vol. 11, No. 2, pp. 157-176.
International Search Report issued Mar. 13, 2012 in Application No. PCT/JP2011/077722.
Floris H. P. Van Velden, et al., "Gap Filling Strategies for 3-D-FBP Reconstructions of High-Resolution Research Tomograph Scans", IEEE Transactions on Medical Imaging, vol. 27, No. 7, 2008, pp. 934-942.

(Continued)

*Primary Examiner* — Jayesh A Patel
*Assistant Examiner* — Iman K Kholdebarin
(74) *Attorney, Agent, or Firm* — Oblon, Spivak, McClelland, Maier & Neustadt, L.L.P.

(57) ABSTRACT

A method of interpolating positron emission tomography (PET) data for reconstructing a PET image, including acquiring PET event data, which was obtained by scanning an object using a PET scanner; generating a two-dimensional line-of-response (LOR) sinogram from the acquired PET event data; determining a plurality of triangles connecting sampling points within the LOR sinogram, wherein adjacent sampling points are connected horizontally row-by-row within the LOR sinogram to determine the plurality of triangles; and determining a uniformly sampled sinogram from the LOR sinogram using the determined plurality of triangles.

9 Claims, 14 Drawing Sheets

OTHER PUBLICATIONS

Huanwen Liu, et al., "On interpolation and approximation by bivariate quintic splines with boundary conditions", 11th IEEE International Conference on Computer-Aided Design and Computer Graphics, 2009, pp. 274-279.

Hugo W. A. M. De Jong, et al., "Correction Methods for Missing Data in Sinograms of the HRRT PET Scanner", IEEE Transactions on Nuclear Science, vol. 50, No. 5, 2003, pp. 1452-1456.

* cited by examiner

SYSTEM AND METHOD FOR TRIANGULAR INTERPOLATION IN IMAGE RECONSTRUCTION FOR PET

FIELD

Embodiments described herein relate generally to a gamma ray scanner system that reconstructs an image based on acquired detector information using a triangular interpolation method.

BACKGROUND

The use of positron emission tomography (PET) is growing in the field of medical imaging. In PET imaging, a radiopharmaceutical agent is introduced into the object to be imaged via injection, inhalation, or ingestion. After administration of the radiopharmaceutical, the physical and bio-molecular properties of the agent will cause it to concentrate at specific locations in the human body. The actual spatial distribution of the agent, the intensity of the region of accumulation of the agent, and the kinetics of the process from administration to eventually elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are destroyed. Most of the time an annihilation event produces two 511 keV gamma rays traveling at substantially 180 degrees apart.

By detecting the two gamma rays, and drawing a line between their locations, i.e., the line-of-response (LOR), one can retrieve the likely location of the original disintegration. While this process will only identify a line of possible interaction, by accumulating a large number of those lines, and through a tomographic reconstruction process, the original distribution can be estimated. In addition to the location of the two scintillation events, if accurate timing (within few hundred picoseconds) is available, a time-of-flight (TOF) calculation can add more information regarding the likely position of the event along the line. The collection of a large number of events creates the necessary information for an image of an object to be estimated through tomographic reconstruction. Two detected events occurring at substantially the same time at corresponding detector elements form a line-of-response that can be histogrammed according to their geometric attributes to define projections, or sinograms to be reconstructed.

In PET image reconstruction, interpolation is sometimes used to obtain a uniformly sampled sinogram from a non-uniformly sampled raw LOR sinogram for the purpose of using FBP (filtered back-projection), 3DRP (re-projection), and FORE (Fourier re-binning) reconstruction algorithms. Usually, such multi-dimensional interpolation is performed based on the values on the uniformly sampled rectangular grid points. However, in a PET system having polygon-shaped detector modules arranged in a ring, the raw LOR sinogram sampling points are not on a rectangular grid, but on diamond-patterned sampling grids, as shown in FIG. 1. These diamond-patterned sampling grids can be considered as scattered sampling points.

An interpolation method that has been used in some applications for scattered data is the so-called linear triangular interpolation method (2D), which is known as the linear tetrahedral method in 3D. In the linear triangular interpolation method, 2D triangles are first formed from the scattered sampling points. For example, in Delaunay triangulation, the triangles are formed by connecting all the neighboring points in the Voronoi diagram of a given point set. Once all of the triangles are determined, each sampling point of the uniformly sampled sinogram would fall within (or on the side of) a particular triangle. Further, the value at the new sampling points is then determined by fitting a linear surface on the triangle using barycentric interpolation. A uniformly sampled grid for an interpolated sinogram, which is determined based on the needs of the reconstruction process, is shown in FIG. 2.

However, problems encountered in interpolating a raw LOR sinogram include: (1) difficulty in determining the nearest neighbors of the desired sampling points since they are not on a rectangular grid; and (2) a lack of a systematic method to deal with irregularly distributed sampling points.

Further, linear triangular interpolation is non-trivial to implement. For example, when forming a triangle, none of the raw sampling points can be inside any other triangles. Since irregular, scattered data triangulation is not unique, it is desired to find an optimal triangulation that produces triangles with the largest minimum angle. Further, the triangulation of the sampling data points can be sensitive to the units used for each variable. Even the Delaunay method, which is an optimal triangulation method, can produce different sets of triangulation in some cases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
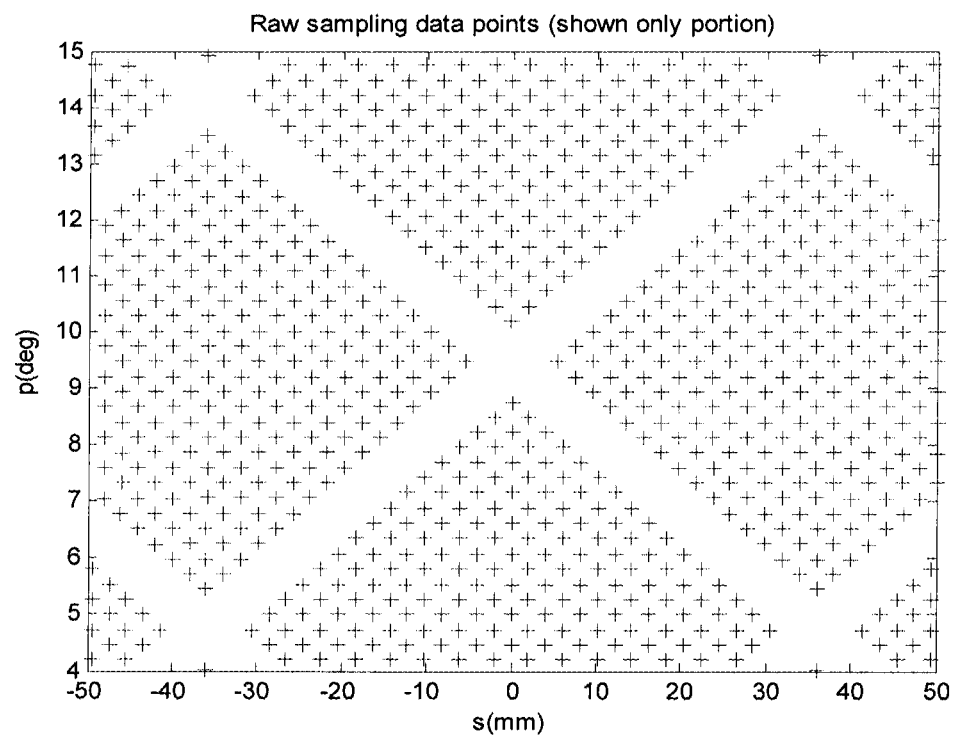
FIG. 1 illustrates a raw LOR sinogram having sampling points that are not on a rectangular grid, but on diamond-patterned sampling grids.
Figure 2:
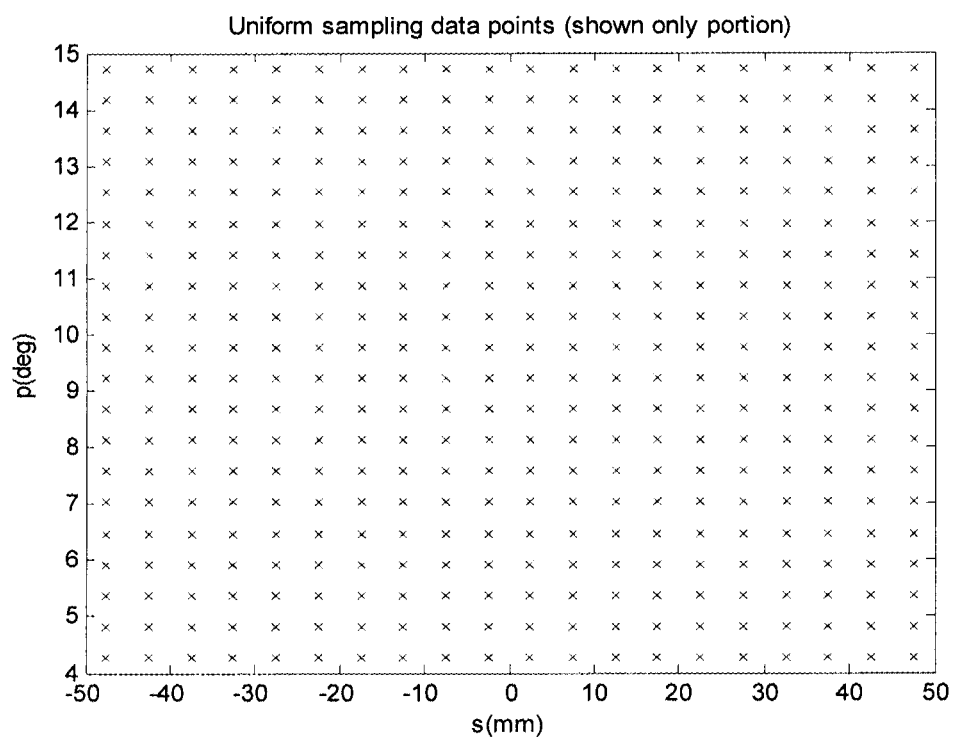
FIG. 2 illustrates a uniformly sampled grid for an interpolated sinogram.

In one embodiment, a method of interpolating PET data for reconstructing a PET image includes the steps of (1) acquiring PET event data, which was obtained by scanning an object using a PET scanner; (2) generating a raw sinogram from the acquired PET event data; (3) determining a plurality of triangles connecting sampling points within the raw sinogram; and (4) determining a uniformly sampled sinogram from the raw sinogram using the determined plurality of triangles.

In another embodiment, the step of generating the raw sinogram includes determining a first table storing a radial value for each sampling point in the raw sinogram, and determining a second table storing an angle value for each sampling point in the raw sinogram; and the step of determining the plurality of triangles comprises connecting adjacent sampling points horizontally row-by-row within the raw sinogram to determine the plurality of triangles.

In another embodiment, the step of generating the raw sinogram includes (1) selecting a first sampling point in the raw sinogram as a first triangle point, the radial and angle values of the first raw sampling point being obtained from the first and second tables using a pair of indices (irad,iphi); (2) determining a second triangle point as a raw sampling point obtained from the first and second tables using indices (irad+1,iphi); (3) determining a third triangle point as a raw sampling point obtained from the first and second tables using indices (irad+2,iphi); and (4) storing the first, second, and third triangle points as vertices of a triangle of the plurality of triangles.

Further, according to another embodiment, the step of determining the plurality of triangles includes repeating the selecting, first determining, second determining, and storing steps for a plurality of first raw sampling points selected by increasing the irad index by one, while keeping the iphi index fixed for a range of irad index values; and repeating the above repeating step for a range of iphi index values.

In another embodiment, the step of determining a uniformly sampled sinogram includes (1) determining, for each uniform sampling point of the uniformly sampled sinogram, a corresponding triangle of the plurality of triangles; and (2) performing, for each triangle of the plurality of triangles, barycentric interpolation using respective data values (e.g., event counts) at the vertices of the triangle, to generate an interpolated data value for the uniform sampling point corresponding to the triangle.

In still another embodiment, the method includes performing reconstruction using the uniformly sampled sinogram and the interpolated data values to generate the PET image.

In another embodiment, a method of interpolating tomography data for reconstructing an image, includes (1) acquiring event data, which was obtained by scanning an object using a scanner; (2) generating a raw sinogram from the acquired event data; (3) determining a plurality of triangles connecting sampling points within the raw sinogram, wherein adjacent sampling points are connected horizontally row-by-row within the raw sinogram to determine the plurality of triangles; and (4) determining a uniformly sampled sinogram from the raw sinogram using the determined plurality of triangles.

This above methods, which are described in more detail below, can be extended into three-dimensional spaces as well.

For a PET system with modular polygon-shaped rings, the raw sinogram sampling points are not completely arbitrary. Instead of using a method like Delaunay triangulation, a direct triangulation method based on crystal indices is used. In particular, this method connects adjacent sampling points to construct triangles horizontally row-by-row, resulting in the triangles shown in FIG. 5. This method simplifies the triangulation process and its implementation significantly.

Further, when forming direct triangles this way, information of the sampling pattern is used to maximize the minimal angle of the triangle.

Next, an embodiment of the triangular interpolation method is described with respect to pseudocode. For a given PET detector system having multiple rings, let the 2D raw sinogram coordinates per ring be irad and iphi, which are integers, where irad=1, 2, . . . , nrad, iphi=1, 2, . . . , nphi, nrad and nphi are the total number of indices in irad and iphi. Let S[irad, iphi] be a table that contains a value of s for a given raw sampling point having indices irad and iphi. Similarly, let P[irad, iphi] be a table containing a value of p for a given raw sampling point having indices irad and iphi. Further, let a triangle have the three vertices $(x(1), y(1))$, $(x(2), y(2))$, and $(x(3), y(3))$.

In one embodiment, the following pseudocode, having two inner loops over Rad and one outer loop over Phi, is used to generate triangles.

```
jT = 0;
loop over Phi index: iphi = 1 to nphi−1 in step of 1
    loop over Rad index: irad = 1 to nrad−2 in step of 1
        x(1)= S(irad   , iphi);
        x(2)= S(irad+1, iphi);
        x(3)= S(irad+2, iphi);
        y(1)= P(irad   , iphi);
        y(2)= P(irad+1, iphi);
        y(3)= P(irad+2, iphi);
        saveTriangle(jT);
        jT++;
    end loop
    loop over Rad index: irad = 1 to nrad−3 in step of 2
        x(1)=S(irad   , iphi);
        x(2)=S(irad+2, iphi);
        x(3)=S(irad+1, iphi+1);
        y(1)=P(irad   , iphi);
        y(2)=P(irad+2, iphi);
        y(3)=P(irad+1, iphi+1);
        saveTriangle(jT);
        jT++;
        x(1)=S(irad+2, iphi);
        x(2)=S(irad+1, iphi+1);
        x(3)=S(irad+3, iphi+1);
        y(1)=P(irad+2, iphi);
        y(2)=P(irad+1, iphi+1);
        y(3)=P(irad+3, iphi+1);
        saveTriangle(jT);
        jT++;
    end loop
end loop
```

At the Phi boundary where iphi=1 (close to 0° angle) or iphi=nphi (close to 180° angle), triangles are formed as if iphi=1 and iphi=nphi are next to each other. This wrap condition is applied, but is not shown here for simplicity.

Figure 4:
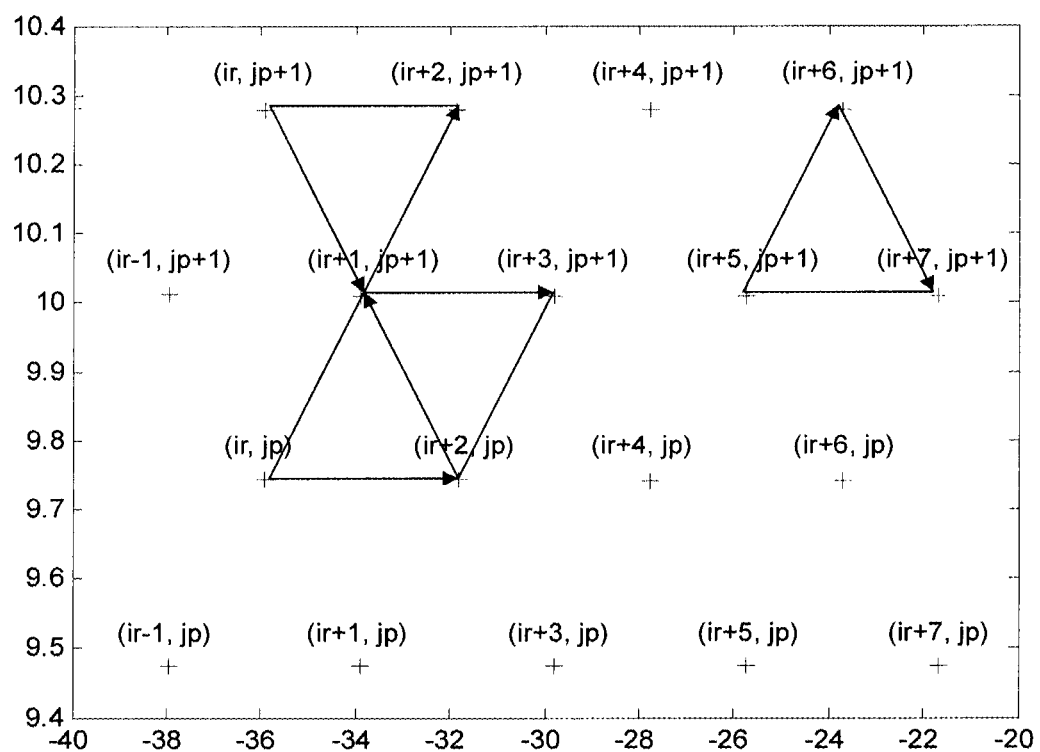
FIG. 4 illustrates examples of triangles formed according to an embodiment described herein.

FIG. 4 illustrates triangles formed using the pseudocode shown above. In particular, the top two triangles are generated by the first inner loop, while the lower two triangles are formed by the second inner loop. Note that the two triangles shown in the bottom part of FIG. 4 are generated by the first and second blocks, respectively, of the second inner loop shown above. Note also that for a fixed value of the index iphi, the P(irad,iphi) value alternates between two values from left to right as the irad index increases. Thus, P(irad,iphi)=P(irad+2,iphi), as illustrated in the triangles in FIG. 4.

For example, the lower left triangle in FIG. 4 is generated by the following pseudocode (second inner block shown above):

```
        x(1)=S(irad  , iphi);
        x(2)=S(irad+2, iphi);
        x(3)=S(irad+1, iphi+1);
        y(1)=P(irad  , iphi);
        y(2)=P(irad+2, iphi);
        y(3)=P(irad+1, iphi+1);
```

In particular, when irad=ir and iphi=jp in the pseudocode above, the first vertex of the triangle (x(1),y(1)) is given by the point labeled (ir,jp) in FIG. 4. Further, according to the pseudo-code, the second vertex (x(2),y(2)) is given by the point labeled (ir+2,jp) in FIG. 4, while the third vertex (x(3), y(3)) is given by the point labeled (ir+1,jp+1) in FIG. 4.

Further, the lower right triangle in FIG. 4 is generated by the following pseudocode (third inner block shown above):

```
        x(1)=S(irad+2, iphi);
        x(2)=S(irad+1, iphi+1);
        x(3)=S(irad+3, iphi+1);
        y(1)=P(irad+2, iphi);
        y(2)=P(irad+1, iphi+1);
        y(3)=P(irad+3, iphi+1);
```

In particular, when irad=ir and iphi=jp in the pseudocode above, the first vertex of the triangle (x(1),y(1)) is given by the point labeled (ir+2,jp) in FIG. 4. Further, according to the pseudocode, the second vertex (x(2),y(2)) is given by the point labeled (ir+1,jp+1) in FIG. 4, while the third vertex (x(3),y(3)) is given by the point labeled (ir+3,jp+1) in FIG. 4.

Figure 5:
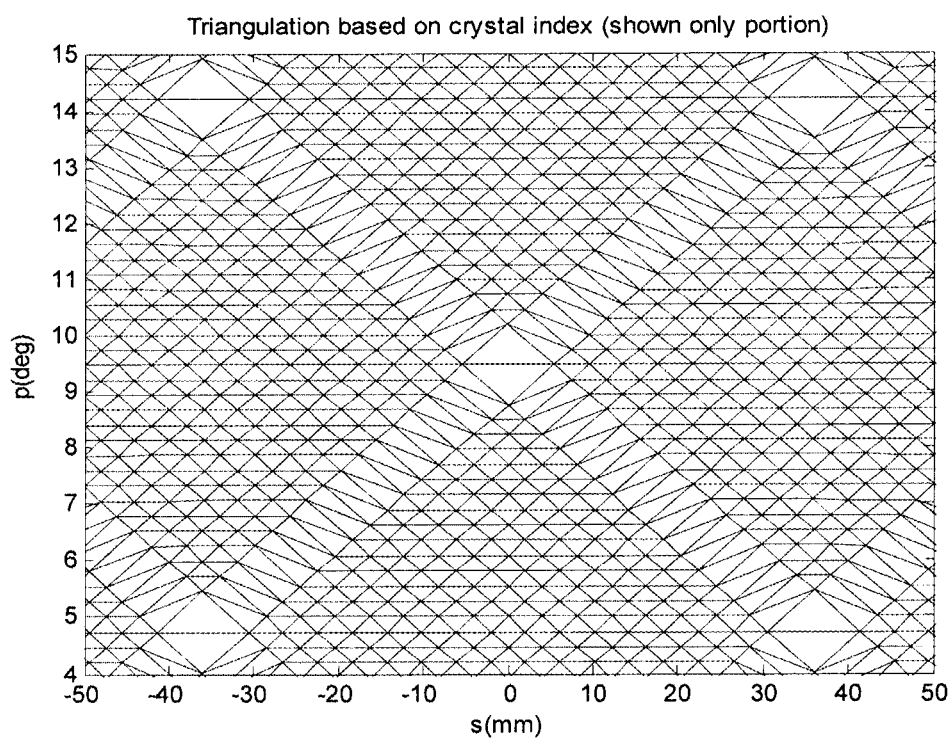
FIG. 5 illustrates the result of triangulation from the sinogram shown in FIG. 1, according to an embodiment described herein.

FIG. 1 illustrates a small portion of the raw sampling space provided as input to the pseudocode shown above. FIG. 5 illustrates the triangulation result of the method for the same sampling space region.

Figure 6:
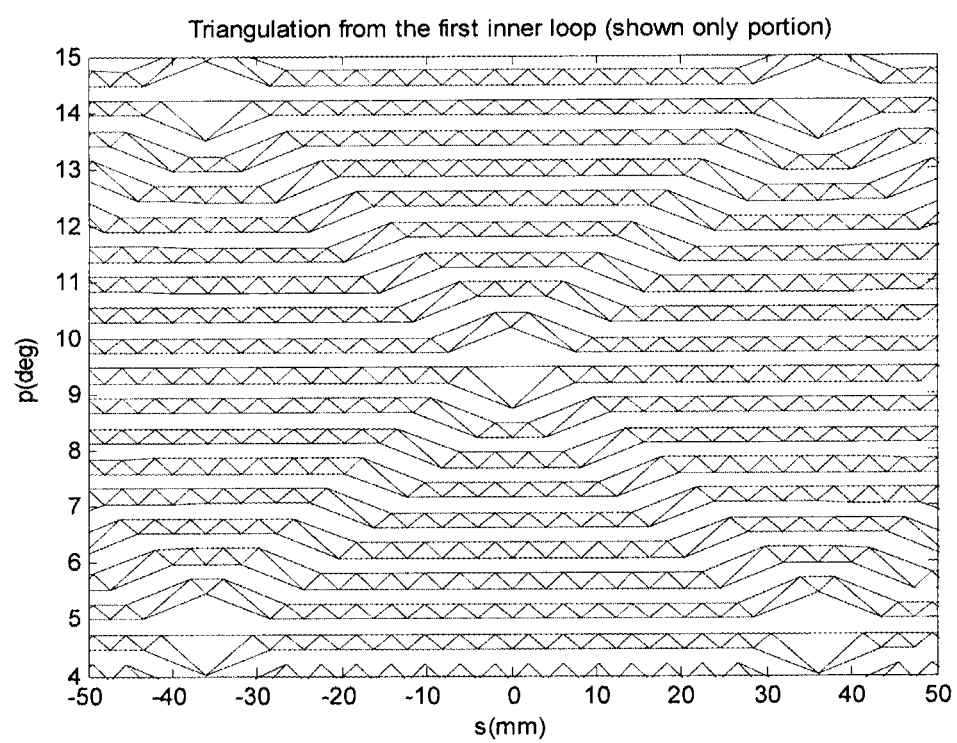
FIGS. 6 and 7 illustrate triangles formed using different components of an embodiment described herein.
Figure 7:
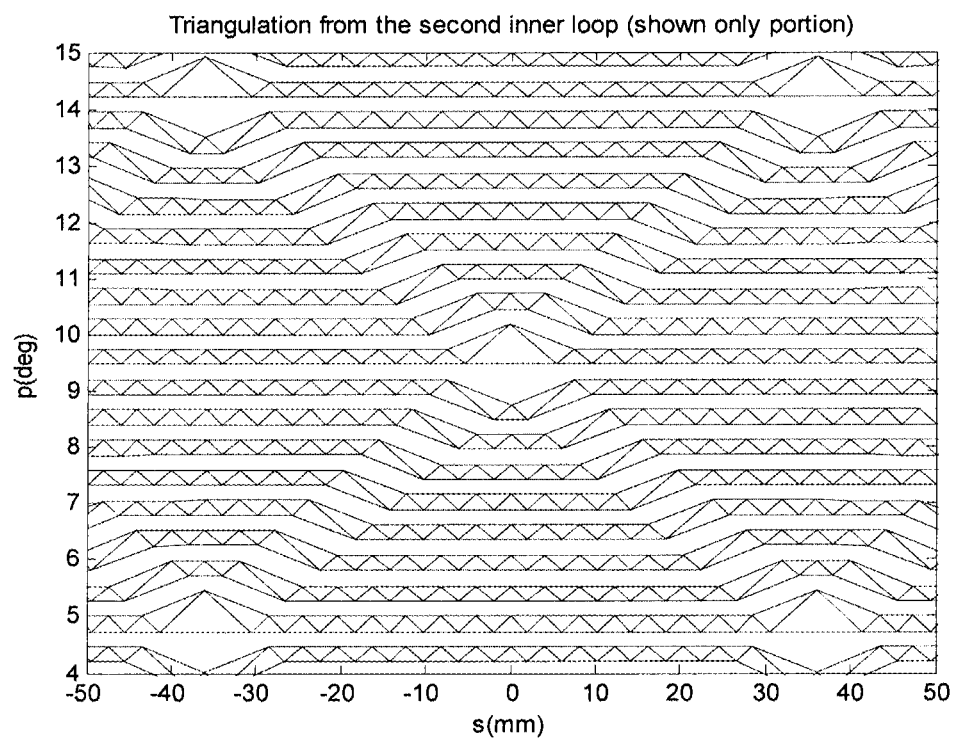

FIG. 6 illustrates the result of the pseudocode shown above when only the first inner loop is executed, while FIG. 7 illustrates the result when only the second inner loop is executed.

Figure 8:
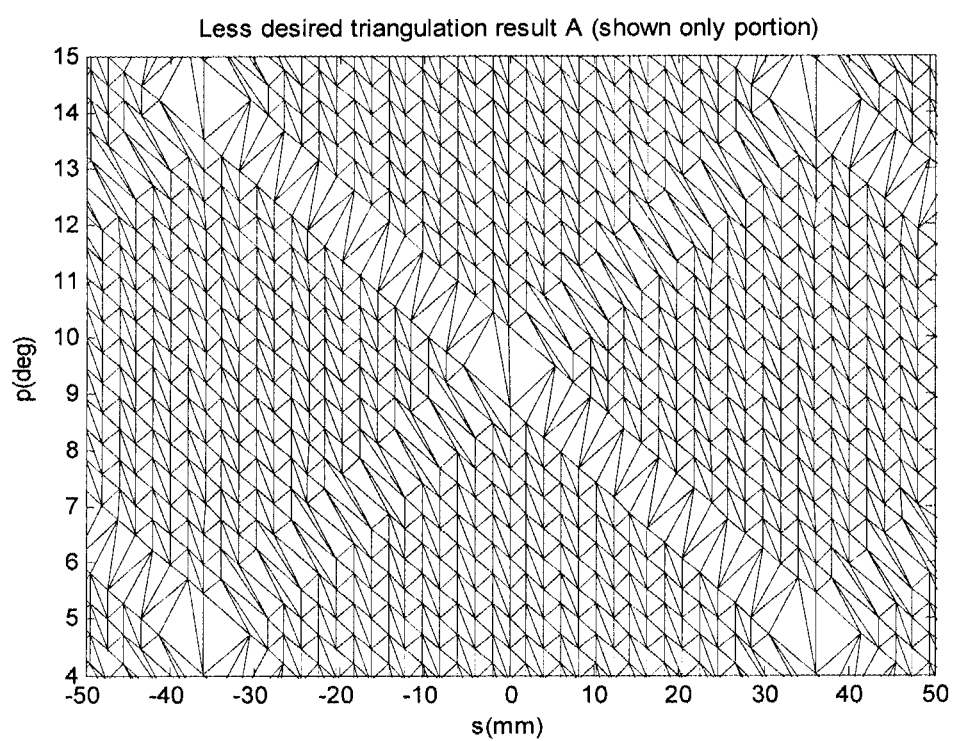
FIG. 8 illustrates triangles formed from the sinogram shown in FIG. 1, according to an alternative embodiment described herein.

In an alternative embodiment, in which the following pseudocode is used to generate some of the triangles, the triangles shown in FIG. 8 are generated.

```
jT = 0;
   loop over Phi index: iphi = 1 to nphi-1 in step of 1
      loop over Rad index: irad = 1 to nrad-2 in step of 1
         x(1)=S(irad  , iphi);
         x(2)=S(irad  , iphi+1);
         x(3)=S(irad+1, iphi);
         y(1)=P(irad  , iphi);
         y(2)=P(irad  , iphi+1);
         y(3)=P(irad+1, iphi);
         saveTriangle(jT);
         jT++;
         x(1)=S(irad+1, iphi+1);
         x(2)=S(irad  , iphi+1);
         x(3)=S(irad+1, iphi);
         y(1)=P(irad+1, iphi+1);
         y(2)=P(irad  , iphi+1);
         y(3)=P(irad+1, iphi);
         saveTriangle(jT);
         jT++;
      end loop
   end loop
```

Figure 9:
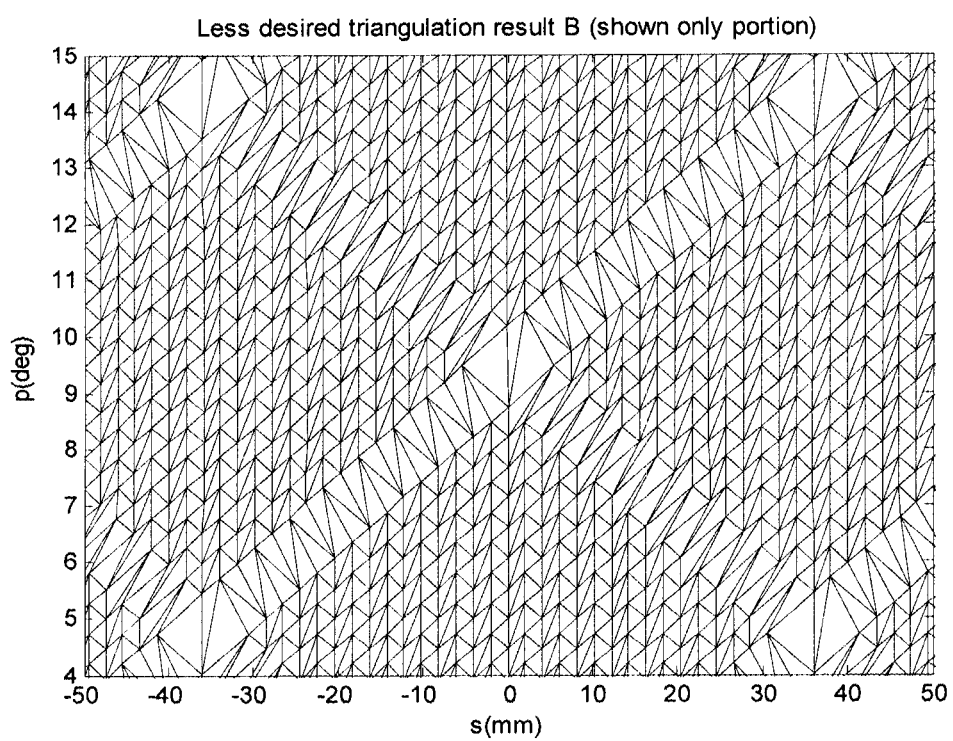
FIG. 9 illustrates triangles formed from the sinogram shown in FIG. 1, according to another alternative embodiment described herein.

In another alternative embodiment, in which the following pseudocode is used to generate some of the triangles, the triangles shown in FIG. 9 are generated.

```
jT = 0;
   loop over Phi index: iphi = 1 to nphi-1 in step of 1
      loop over Rad index: irad = 1 to nrad-2 in step of 1
         x(1)=S(irad  , iphi);
         x(2)=S(irad  , iphi+1);
         x(3)=S(irad+1, iphi+1);
         y(1)=P(irad  , iphi);
         y(2)=P(irad  , iphi+1);
         y(3)=P(irad+1, iphi+1);
         saveTriangle(jT);
         jT++;
         x(1)=S(irad  , iphi);
         x(2)=S(irad+1, iphi+1);
         x(3)=S(irad+1, iphi);
         y(1)=P(irad  , iphi);
         y(2)=P(irad+1, iphi+1);
         y(3)=P(irad+1, iphi);
         saveTriangle(jT);
         jT++;
      end loop
   end loop
```

Note that some of the resultant triangles in FIGS. 8 and 9 are narrow triangles, which is a less desirable result.

In 3D acquisition, the 3D raw sinogram has coordinates (Rad, Phi, ringCombination). The related interpolated sinogram has four dimension (s, p, z, tilt), where z is the average of axial position of a LOR and tilt is the axial tilt angle of the LOR with respect to the transaxial plane. The ringCombination in the 3D LOR sinogram relates to (z, tilt) in the interpolated sinogram.

Embodiments of the triangular interpolation method disclosed herein have several advantages.

First, they provide a systematic way to find the nearest neighbors of a desired sampling point and they can be applied to a scattered data distribution.

Figure 3:
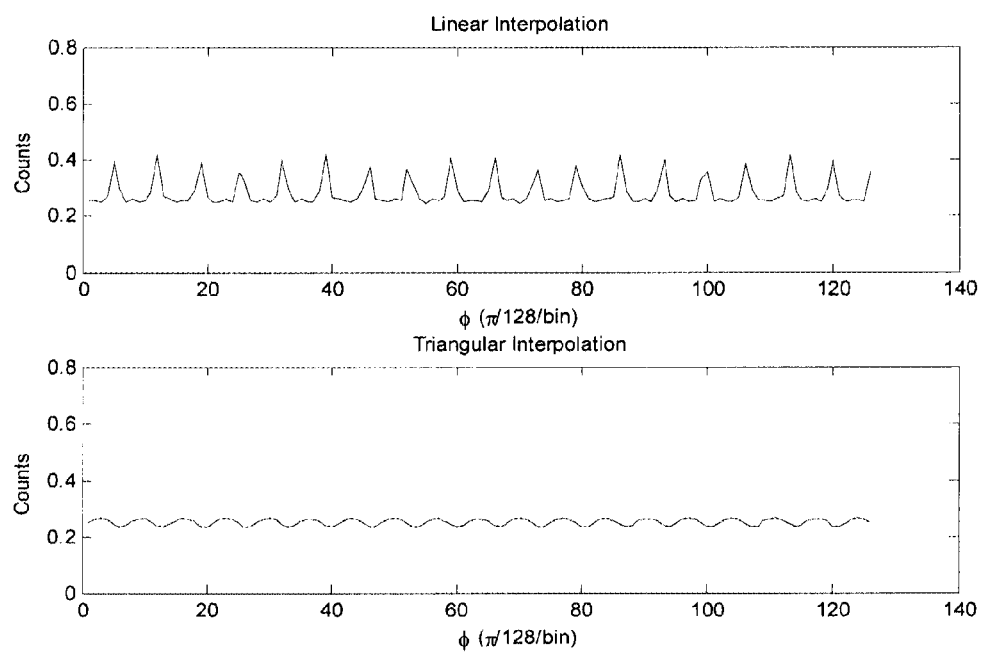
FIG. 3 is a comparison between linear interpolation and triangular interpolation for a 2D sinogram of a point source (small disk) placed at the center of the field-of-view, which is a uniformly distributed line at a center radial bin.

Second, the method is local, and it determines the interpolated value at the desired sampling point by using the nearest neighbors only. In contrast, the linear interpolation method is a global method (relatively speaking) in that all neighboring raw sampling points within neighboring bins contribute to the desired sampling point. The local nature of the method helps to improve the interpolation results near the boundary of activity concentration. For example, one extreme case is a 2D sinogram of a point source (small disk) placed at the center of the field-of-view, which is a uniformly distributed line at center Rad, as shown in FIG. 3. The linear interpolation method shown in the top of FIG. 3 results in a severe non-uniformly distribution, while the triangular interpolation gives a much improved result, as shown at the bottom of FIG. 3.

Third, implementations of embodiments of the disclosed triangulation method are straightforward, easy to implement, and produce desirable results.

FIGS. 10A-10D illustrate the steps in a method of interpolating PET data for reconstructing a PET image according to one embodiment.

Figure 10A:
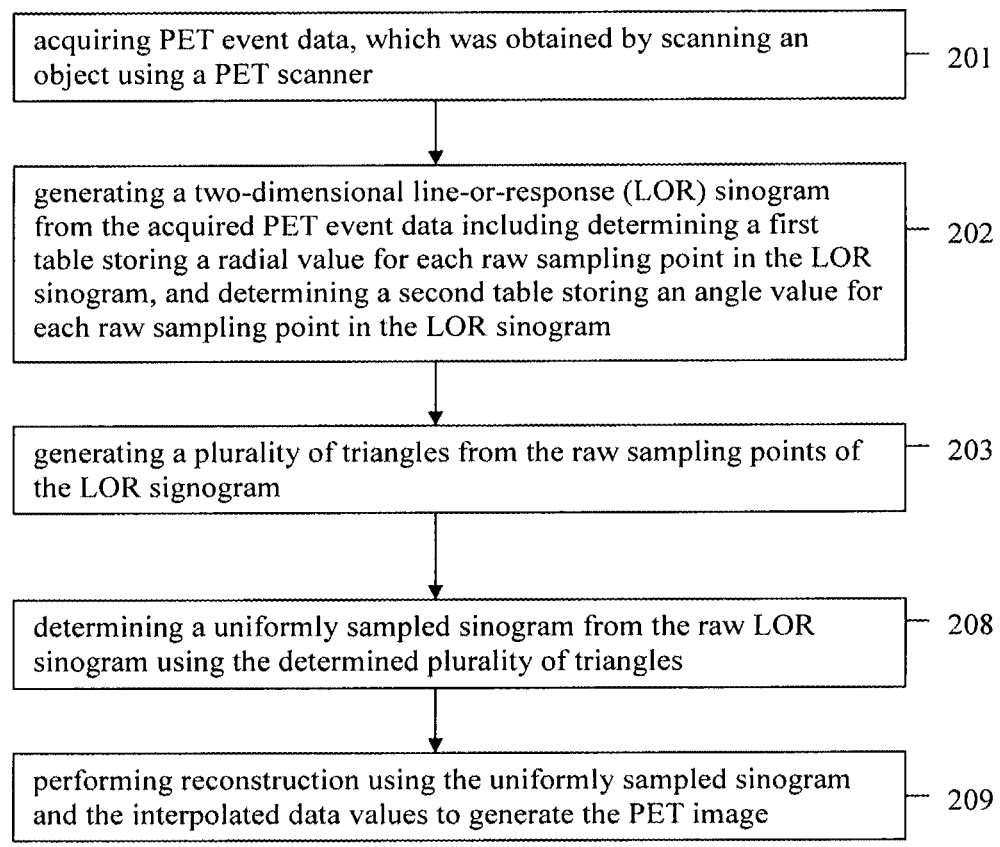
FIGS. 10A-10D illustrate steps in a method according to an embodiment described herein.

FIG. 10A illustrates the overall method in this embodiment.

In step 201, PET event data, which was obtained by scanning an object using a PET scanner, is obtained. The PET event data can be retrieved from a memory, to which it was previously stored following a PET scan. The event data can be organized into a list suitable for list-mode reconstruction, as described in related application Ser. No. 12/571,562, the contents of which are incorporated herein by reference.

In step 202, a raw line-of-response (LOR) sinogram is generated from the acquired PET event data. As discussed above, for the two-dimensional case, the step of generating the LOR sinogram includes determining a first table S[irad, iphi] storing a radial value for each raw sampling point in the LOR sinogram, and determining a second table P[irad,iphi] storing an angle value for each raw sampling point in the LOR sinogram. The radial and angle values of a raw sampling point are obtained from the first and second tables using a pair of indices (irad,iphi).

Figure 10B:
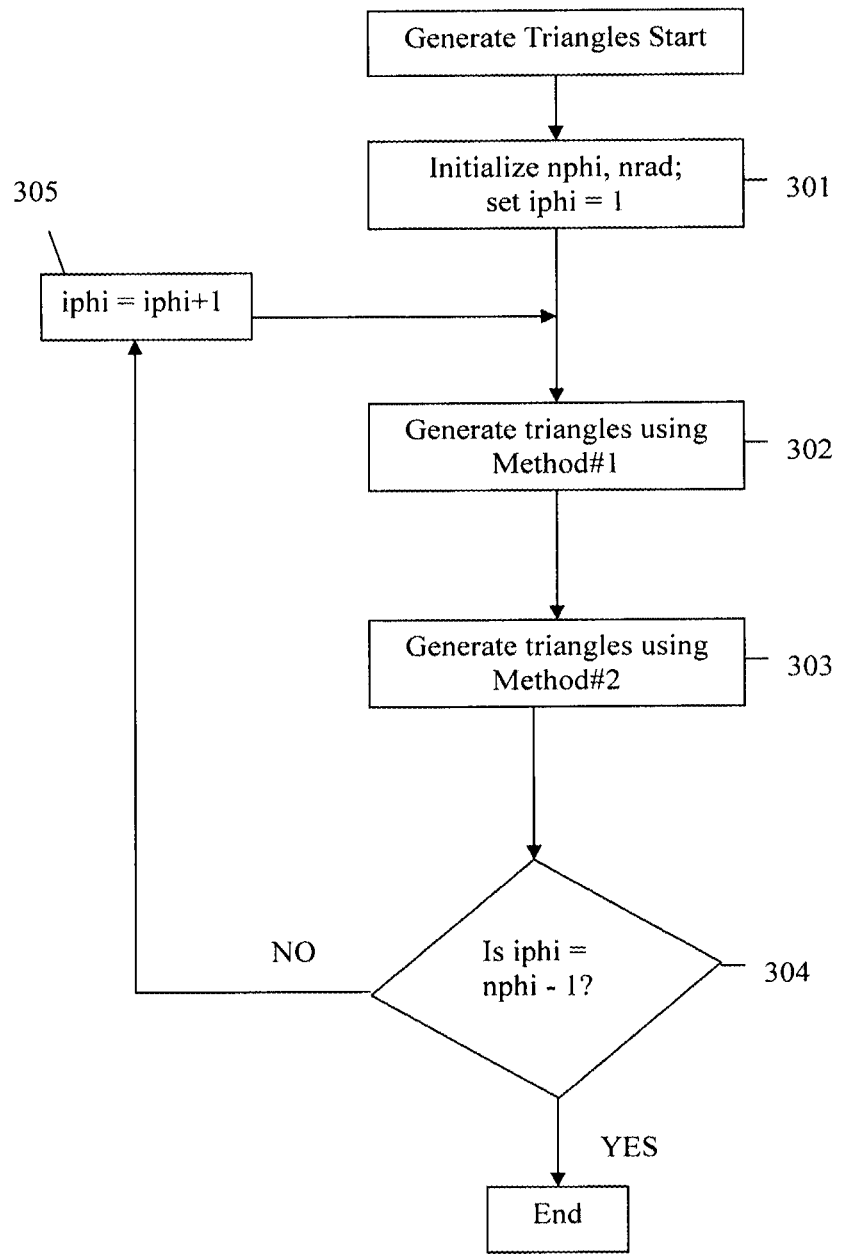
Figure 10C:
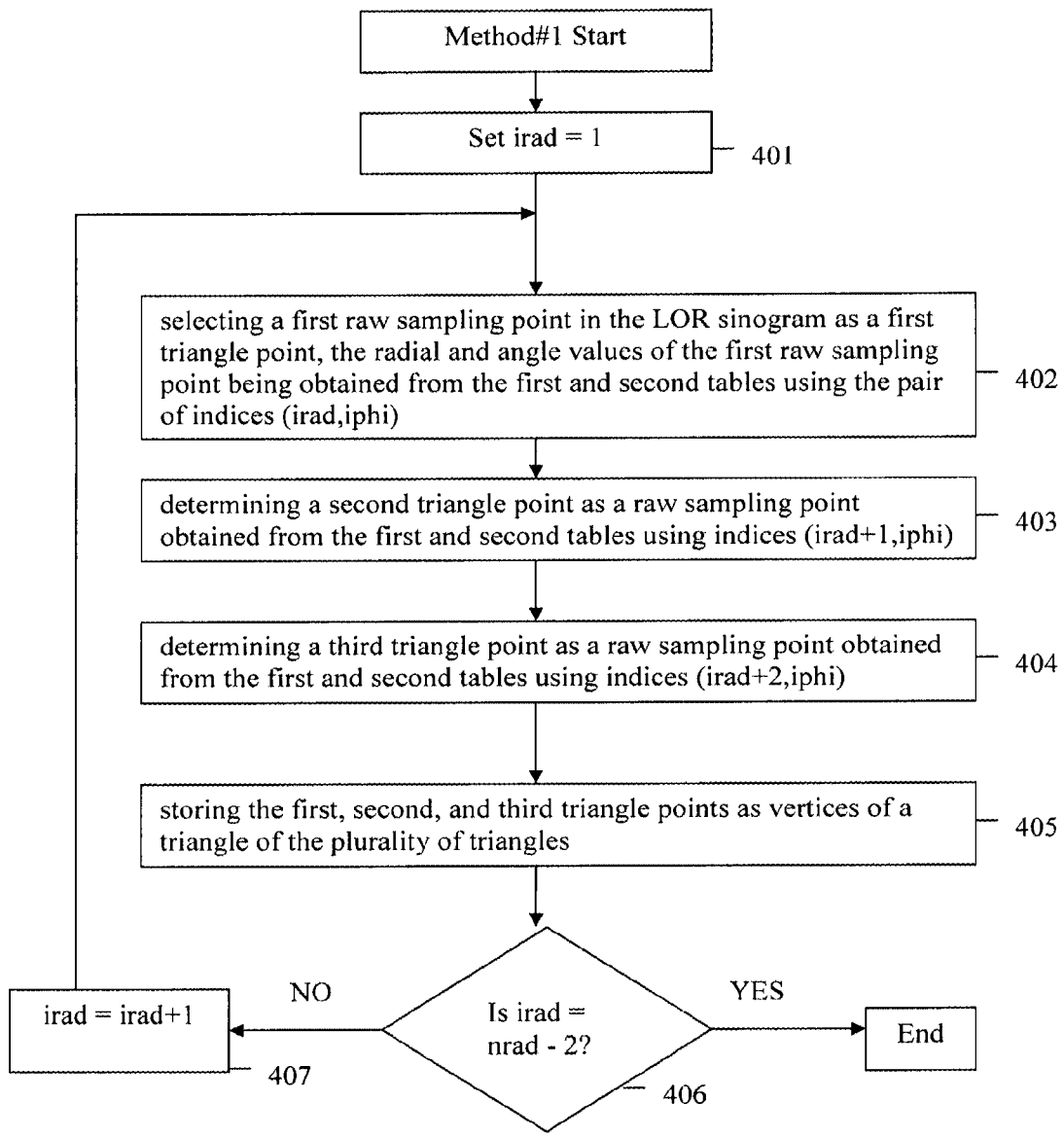
Figure 10D:
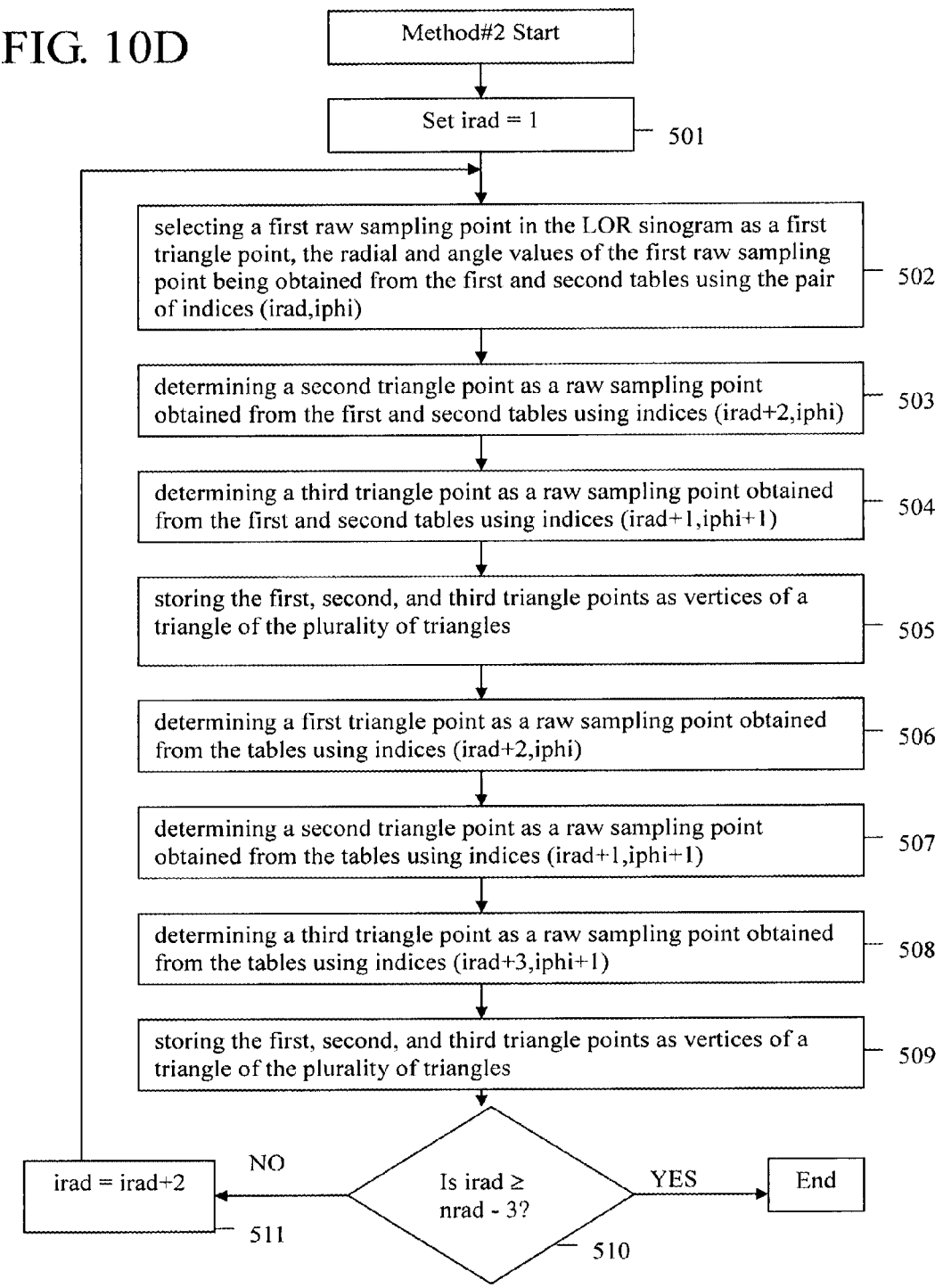

In step 203, a plurality of triangle are generated from the raw sampling points using various methods, as shown in FIGS. 10B-10D.

In step 208, a uniformly sampled sinogram is determined from the raw LOR sinogram using the determined plurality of triangles. In particular, step 208 includes determining, for each uniform sampling point of the uniformly sampled sinogram, a corresponding triangle of the plurality of triangles, and performing, for each such triangle of the plurality of triangles, barycentric interpolation using respective data values at the vertices of the triangle, to generate an interpolated data value for the uniform sampling point corresponding to the triangle.

In step 209, reconstruction is performed using the uniformly sampled sinogram and the interpolated data values to generate the PET image.

FIG. 10B illustrates a method to generate the plurality of triangles.

In step 301, the parameters nphi and nrad are initialized based on the size of the first and second tables. Also, the index iphi is initialized to one.

In step 302, triangles are generated and stored using a first method, i.e., the first inner loop described above. See FIG. 10C.

In step 303, additional triangles are generated and stored using a second method, i.e., the second inner loop described above. See FIG. 10D In step 304, if iphi=nphi−1, the process of generating triangles ends, otherwise the method proceeds to step 305, in which the iphi index is incremented by one, and the process proceeds to step 302 again.

FIG. 10C illustrates the first method of generating triangles according to the first inner loop of the pseudocode shown above.

In step 401, the irad index is initialized to one.

In step 402, a first raw sampling point in the LOR sinogram is selected as a first triangle point, the radial and angle values of the first raw sampling point being obtained from the first and second tables using the pair of indices (irad,iphi).

In step 403, a second triangle point is determined as the raw sampling point obtained from the first and second tables using indices (irad+1,iphi).

In step 404, a third triangle point is determined as the raw sampling point obtained from the first and second tables using indices (irad+2,iphi).

In step 405, the first, second, and third triangle points are stored in a memory as vertices of a triangle of the plurality of triangles.

In step 406, if irad equal nrad−2, then the process ends. Otherwise, the irad index is incremented by one in step 407 and the process proceeds back to step 402.

FIG. 10D illustrates the second method of generating triangles according to the second inner loop of the pseudocode shown above.

In step 501, the irad index is initialized to one.

In step 502, a first raw sampling point in the LOR sinogram is selected as a first triangle point, the radial and angle values of the first raw sampling point being obtained from the first and second tables using the pair of indices (irad,iphi).

In step 503, a second triangle point is determined as the raw sampling point obtained from the first and second tables using indices (irad+2,iphi).

In step 504, a third triangle point is determined as the raw sampling point obtained from the first and second tables using indices (irad+1,iphi+1).

In step 505, the first, second, and third triangle points are stored in a memory as vertices of a triangle of the plurality of triangles.

In step 506, a first raw sampling point in the LOR sinogram is selected as a first triangle point, the radial and angle values of the first raw sampling point being obtained from the first and second tables using the pair of indices (irad+2,iphi).

In step 507, a second triangle point is determined as the raw sampling point obtained from the first and second tables using indices (irad+1,iphi+1).

In step 508, a third triangle point is determined as the raw sampling point obtained from the first and second tables using indices (irad+3,iphi+1).

In step 509, the first, second, and third triangle points are stored in a memory as vertices of a triangle of the plurality of triangles.

In step 510, if irad is greater than or equal to nrad−3, then the process ends. Otherwise, the irad index is incremented by two in step 511 and the process proceeds back to step 502.

Figure 11:
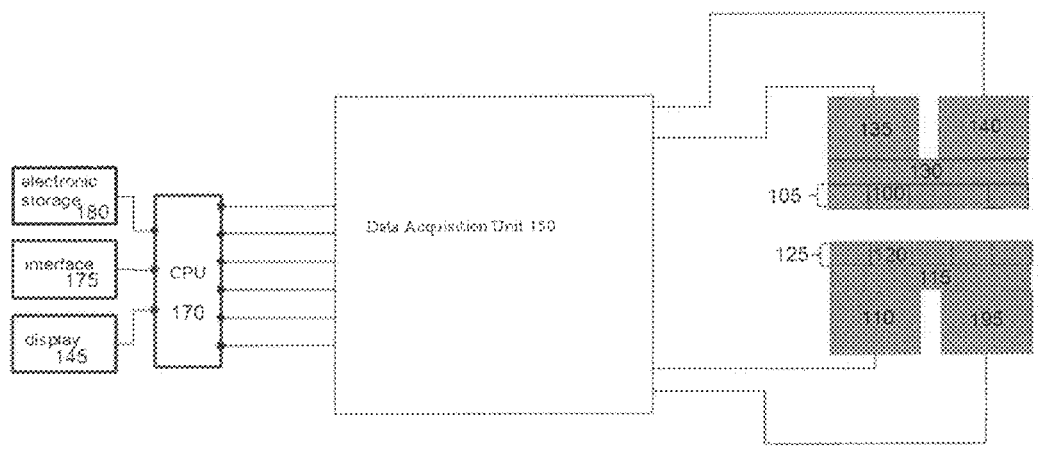
FIG. 11 illustrates a gamma ray detection system that can be used to obtain PET event information according to embodiments described herein.

FIG. 11 is a schematic drawing of a gamma ray detection system that can be used to obtain gamma ray or PET event information according to embodiments of the present advancements. In FIG. 11, photomultiplier tubes 135 and 140 are arranged over light guide 130, and the array of scintillation crystals 105 is arranged beneath the light guide 130. A second array of scintillation crystals 125 is disposed opposite the scintillation crystals 105 with light guide 115 and photomultiplier tubes 195 and 110 arranged thereover. The photomultiplier tubes, light guide, and scintillation crystals can form a detector module, wherein the gamma ray detection system includes a plurality of detector modules arranged in a ring.

In FIG. 11, when gamma rays are emitted from a body under test (not shown), the gamma rays travel in opposite directions, approximately 180° from each other. Gamma ray detection occurs simultaneously at scintillation crystals 100 and 120, and a scintillation event is determined when the gamma rays are detected at scintillation crystals 100 and 120 within a predefined time limit. Thus, the gamma ray timing detection system detects gamma rays simultaneously at scintillation crystals 100 and 120. However, for simplicity only, gamma ray detection is described relative to scintillation crystal 100. One of ordinary skill in the art will recognize, however, that the description given herein with respect to scintillation crystal 100 is equally applicable to gamma ray detection at scintillation crystal 120.

Each photomultiplier tube 110, 135, 140 and 195 is respectively connected to data acquisition unit 150. Data acquisition unit includes hardware configured to process the signals from the photomultiplier tubes. The data acquisition unit 150 measures the arrival time of the gamma ray. The data acquisition unit 150 produces two outputs (one for the combination of PMT 135/140 and one for the combination of PMT 110/195) which encodes the time of the discriminator pulse relative to a system clock (not shown). For a time-of-flight PET system, the data acquisition unit 150 typically produces a time stamp with an accuracy of 15 to 25 ps. The data acquisition unit measures the amplitude of the signal on each PMT (four of the outputs from data acquisition unit 150).

The data acquisition unit outputs are provided to a CPU, 170, for processing. The processing consists of estimating an energy and position from the data acquisition unit outputs and an arrival time from the time stamps output for each event, and may include the application of a many correction steps, based on prior calibrations, to improve the accuracy of the energy, position, and time estimates. As one of ordinary skill in the art would recognize, the CPU 170 can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the CPU 170 may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art.

Once processed by the CPU 170, the processed signals are stored in electronic storage 180, and/or displayed on display 145. As one of ordinary skill in the art would recognize, electronic storage 180 may be a hard disk drive, CD-ROM drive, DVD drive, FLASH drive, RAM, ROM or any other electronic storage known in the art. Display 145 may be implemented as an LCD display, CRT display, plasma display, OLED, LED or any other display known in the art. As such, the descriptions of the electronic storage 180 and the display 145 provided herein are merely exemplary and in no way limit the scope of the present advancements.

FIG. 11 also includes an interface 175 through which the gamma ray detection system interfaces with other external devices and/or a user. For example, interface 175 may be a USB interface, PCMCIA interface, Ethernet interface or any other interface known in the art. Interface 175 may also be wired or wireless and may include a keyboard and/or mouse or other human interface devices known in the art for interacting with a user.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of interpolating positron emission tomography (PET) data for reconstructing a PET image, comprising:
acquiring PET event data, which was obtained by scanning an object using a PET scanner;
generating a raw sinogram from the acquired PET event data;
determining a plurality of triangles connecting sampling points within the raw sinogram;
determining a uniformly sampled sinogram from the raw sinogram using the determined plurality of triangles,
wherein the step of generating the raw sinogram comprises determining a first table storing a radial value for each sampling point in the raw sinogram, and determining a second table storing an angle value for each sampling point in the raw sinogram;
the step of determining the plurality of triangles comprises connecting adjacent sampling points horizontally row-by-row within the raw sinogram to determine the plurality of triangles;
the step of determining the plurality of triangles further comprises:
selecting a first sampling point in the raw sinogram as a first triangle point, the radial and angle values of the first sampling point being obtained from the first and second tables using a pair of indices (irad,iphi);
determining a second triangle point as a sampling point obtained from the first and second tables using indices (irad+1,iphi);
determining a third triangle point as a sampling point obtained from the first and second tables using indices (irad+2,iphi);
storing the first, second, and third triangle points as vertices of a triangle of the plurality of triangles; and
wherein the step of determining a uniformly sampled sinogram comprises:
determining, for each uniform sampling point of the uniformly sampled sinogram, a corresponding triangle of the plurality of triangles; and
performing, for each triangle of the plurality of triangles, barycentric interpolation using respective data values at the vertices of the triangle, to generate an interpolated data value for the uniform sampling point corresponding to the triangle.

2. A method of interpolating positron emission tomography (PET) data for reconstructing a PET image, comprising:
acquiring PET event data, which was obtained by scanning an object using a PET scanner;
generating a raw sinogram from the acquired PET event data;
determining a plurality of triangles connecting sampling points within the raw sinogram;
determining a uniformly sampled sinogram from the raw sinogram using the determined plurality of triangles,
wherein the step of generating the raw sinogram comprises determining a first table storing a radial value for each sampling point in the raw sinogram, and determining a second table storing an angle value for each sampling point in the raw sinogram;
the step of determining the plurality of triangles comprises connecting adjacent sampling points horizontally row-by-row within the raw sinogram to determine the plurality of triangles;
the step of determining the plurality of triangles further comprises:
selecting a first sampling point in the raw sinogram as a first triangle point, the radial and angle values of the first sampling point being obtained from the first and second tables using a pair of indices (irad,iphi);

determining a second triangle point as a sampling point obtained from the first and second tables using indices (irad+2,iphi);

determining a third triangle point as a sampling point obtained from the first and second tables using indices (irad+1,iphi+1);

storing the first, second, and third triangle points as vertices of a triangle of the plurality of triangles; and wherein the step of determining a uniformly sampled sinogram comprises:

determining, for each uniform sampling point of the uniformly sampled sinogram, a corresponding triangle of the plurality of triangles; and performing, for each triangle of the plurality of triangles, barycentric interpolation using respective data values at the vertices of the triangle, to generate an interpolated data value for the uniform sampling point corresponding to the triangle.

3. A method of interpolating positron emission tomography (PET) data for reconstructing a PET image, comprising:

acquiring PET event data, which was obtained by scanning an object using a PET scanner;

generating a raw sinogram from the acquired PET event data;

determining a plurality of triangles connecting sampling points within the raw sinogram;

determining a uniformly sampled sinogram from the raw sinogram using the determined plurality of triangles, wherein the step of generating the raw sinogram comprises determining a first table storing a radial value for each sampling point in the raw sinogram, and determining a second table storing an angle value for each sampling point in the raw sinogram;

the step of determining the plurality of triangles comprises connecting adjacent sampling points horizontally row-by-row within the raw sinogram to determine the plurality of triangles;

the step of determining the plurality of triangles further comprises:

selecting a first sampling point in the raw sinogram as a first triangle point, the radial and angle values of the first sampling point being obtained from the first and second tables using a pair of indices (irad+2,iphi);

determining a second triangle point as a sampling point obtained from the first and second tables using indices (irad+1,iphi+1);

determining a third triangle point as a sampling point obtained from the first and second tables using indices (irad+3,iphi+1);

storing the first, second, and third triangle points as vertices of a triangle of the plurality of triangles; and wherein the step of determining a uniformly sampled sinogram comprises:

determining, for each uniform sampling point of the uniformly sampled sinogram, a corresponding triangle of the plurality of triangles; and performing, for each triangle of the plurality of triangles, barycentric interpolation using respective data values at the vertices of the triangle, to generate an interpolated data value for the uniform sampling point corresponding to the triangle.

4. The method of claim 1, wherein the step of determining the plurality of triangles comprises:

repeating the selecting, determining, determining, and storing steps for a plurality of first sampling points selected by increasing the irad index by one, while keeping the iphi index fixed for a range of irad index values; and repeating the above repeating step for a range of iphi index values.

5. The method of claim 1, further comprising:

performing reconstruction using the uniformly sampled sinogram and the interpolated data values to generate the PET image.

6. An apparatus for interpolating PET data for reconstructing a PET image, comprising:

a memory storing PET event data, which was obtained by scanning an object using a PET scanner;

a processor configured to:

generate a raw sinogram from the acquired PET event data;

determine a plurality of triangles connecting sampling points within the raw sinogram;

determine a uniformly sampled sinogram from the raw sinogram using the determined plurality of triangles wherein the processor is further configured to:

determine, for each uniform sampling point of the uniformly sampled sinogram, a corresponding triangle of the plurality of triangles;

perform, for each triangle of the plurality of triangles, barycentric interpolation using respective data values at the vertices of the triangle, to generate an interpolated data value for the uniform sampling point corresponding to the triangle, wherein, in determining the plurality of triangles, the processor is further configured to:

select a first sampling point in the raw sinogram as a first triangle point, the radial and angle values of the first sampling point being obtained from the first and second tables using a pair of indices (irad,iphi);

determine a second triangle point as a sampling point obtained from the first and second tables using indices (irad+1,iphi);

determine a third triangle point as a sampling point obtained from the first and second tables using indices (irad+2,iphi);

store the first, second, and third triangle points as vertices of a triangle of the plurality of triangles wherein, in determining a uniformly sampled sinogram, the processor is further configured to:

determine, for each uniform sampling point of the uniformly sampled sinogram, a corresponding triangle of the plurality of triangles; and perform, for each triangle of the plurality of triangles, barycentric interpolation using respective data values at the vertices of the triangle, to generate an interpolated data value for the uniform sampling point corresponding to the triangle.

7. The apparatus of claim 6, wherein the processor is further configured to:

perform reconstruction using the uniformly sampled sinogram and the interpolated data values to generate the PET image.

8. A non-transitory computer-readable medium storing a computer program that, when executed by a computer, causes the computer to perform a method of interpolating PET data for reconstructing a PET image, the method comprising:

acquiring PET event data, which was obtained by scanning an object using a PET scanner;

generating a raw sinogram from the acquired PET event data;

determining a plurality of triangles connecting sampling points within the raw sinogram;

determining a uniformly sampled sinogram from the raw sinogram using the determined plurality of triangles wherein the step of determining a uniformly sampled sinogram comprises:

determining, for each uniform sampling point of the uniformly sampled sinogram, a corresponding triangle of the plurality of triangles; and performing, for each triangle of the plurality of triangles, barycentric interpolation using respective data values at the vertices of the triangle, to generate an interpolated data value for the uniform sampling point corresponding to the triangle, wherein the step of determining the plurality of triangles further comprises:

selecting a first sampling point in the raw sinogram as a first triangle point, the radial and angle values of the first sampling point being obtained from the first and second tables using a pair of indices (irad,iphi);

determining a second triangle point as a sampling point obtained from the first and second tables using indices (irad+1,iphi);

determining a third triangle point as a sampling point obtained from the first and second tables using indices (irad+2,iphi);

storing the first, second, and third triangle points as vertices of a triangle of the plurality of triangles.

9. The computer-readable medium of claim 8, further comprising:

performing reconstruction using the uniformly sampled sinogram and the interpolated data values to generate the image.

* * * * *